United States Patent
Nelson

(10) Patent No.: US 11,045,719 B2
(45) Date of Patent: Jun. 29, 2021

(54) METHOD AND COMPUTER DEVICE FOR CONTROLLING A TOUCH SCREEN

(71) Applicant: KING.COM LIMITED, St. Julians (MT)

(72) Inventor: Oliver Nelson, Barcelona (ES)

(73) Assignee: KING.COM LTD., St. Julians (MT)

( * ) Notice: Subject to any disclaimer, the term of this patent is extended or adjusted under 35 U.S.C. 154(b) by 0 days.

(21) Appl. No.: 16/128,762

(22) Filed: Sep. 12, 2018

(65) Prior Publication Data

US 2020/0078667 A1   Mar. 12, 2020

(51) Int. Cl.
*A63F 13/00* (2014.01)
*A63F 9/24* (2006.01)
*A63F 13/2145* (2014.01)
*G06F 3/0484* (2013.01)
*G06F 3/0488* (2013.01)

(52) U.S. Cl.
CPC ........ *A63F 13/2145* (2014.09); *G06F 3/0484* (2013.01); *G06F 3/04886* (2013.01); *G06F 2203/04808* (2013.01)

(58) Field of Classification Search
CPC ............... A63F 13/214; A63F 13/2145; A63F 2300/1068; A63F 2300/1075; G06F 3/0488; G06F 3/04886
See application file for complete search history.

(56) References Cited

U.S. PATENT DOCUMENTS

| | | | |
|---|---|---|---|
| 8,382,591 B2* | 2/2013 | Toy | A63F 13/10 463/37 |
| 9,089,769 B2* | 7/2015 | Yamaoka | A63F 13/10 |
| 9,533,225 B2* | 1/2017 | Sakurai | A63F 13/837 |
| 9,561,432 B2* | 2/2017 | Alexeev | A63F 13/10 |
| 9,772,743 B1* | 9/2017 | Mueller | G06F 3/04812 |
| 9,782,673 B2* | 10/2017 | Takagi | A63F 13/26 |
| 9,827,490 B2* | 11/2017 | Mays, III | A63F 13/2145 |
| 9,901,824 B2* | 2/2018 | Borodovsky | A63F 13/537 |
| 10,232,250 B2* | 3/2019 | Omi | A63F 13/00 |
| 2010/0041480 A1* | 2/2010 | Wong | A63F 13/06 463/37 |
| 2010/0321319 A1* | 12/2010 | Hefti | G06F 3/04883 345/173 |
| 2011/0172013 A1* | 7/2011 | Shirasaka | G06F 3/0488 463/37 |
| 2011/0212776 A1* | 9/2011 | Kishimoto | A63F 13/803 463/31 |
| 2011/0285636 A1* | 11/2011 | Howard | G06F 3/04815 345/173 |
| 2012/0169610 A1* | 7/2012 | Berkes | G06F 3/04883 345/173 |

(Continued)

*Primary Examiner* — Milap Shah
(74) *Attorney, Agent, or Firm* — Saul Ewing Arnstein & Lehr LLP

(57) ABSTRACT

A computer device has a touch screen which receive a series of inputs from a user. Each of the inputs comprise a single touch input of the user. A computer implemented game is displayed on the touch screen and has at least one game object controlled by the series of inputs. The game object performs a first action in response to at least one first touch in the series of inputs and a second different action in response to at least one second touch in the series of inputs. The first and second actions are performed by the game object one in conjunction with the other.

23 Claims, 13 Drawing Sheets

(56) References Cited

U.S. PATENT DOCUMENTS

| | | | | |
|---|---|---|---|---|
| 2012/0242590 | A1* | 9/2012 | Baccichet | G06F 3/0488 345/173 |
| 2012/0277000 | A1* | 11/2012 | Vange | A63F 13/06 463/37 |
| 2013/0031515 | A1* | 1/2013 | Funabashi | G06F 3/04886 715/863 |
| 2013/0084980 | A1* | 4/2013 | Hammontree | A63F 13/06 463/36 |
| 2013/0217498 | A1* | 8/2013 | Wang | A63F 13/2145 463/37 |
| 2013/0288790 | A1* | 10/2013 | Wang | A63F 13/06 463/31 |
| 2013/0303281 | A1* | 11/2013 | Argiro | A63F 13/02 463/31 |
| 2014/0011584 | A1* | 1/2014 | Shin | G06F 3/048 463/31 |
| 2014/0066195 | A1* | 3/2014 | Matsui | A63F 13/42 463/30 |
| 2014/0066197 | A1* | 3/2014 | Cousins | A63F 13/426 463/31 |
| 2014/0364214 | A1* | 12/2014 | Ayoub | A63F 13/06 463/31 |
| 2015/0094127 | A1* | 4/2015 | Canose | G06F 3/04842 463/2 |
| 2015/0157932 | A1* | 6/2015 | Kwon | G06Q 50/00 463/31 |
| 2015/0182856 | A1* | 7/2015 | Mays, III | A63F 13/2145 463/31 |
| 2016/0313912 | A1* | 10/2016 | Keam | G06F 3/04886 |
| 2017/0113137 | A1* | 4/2017 | Alexeev | A63F 13/10 |
| 2017/0220102 | A1* | 8/2017 | Kim | G06F 3/01 |
| 2018/0318705 | A1* | 11/2018 | Moberg | A63F 13/2145 |

* cited by examiner

METHOD AND COMPUTER DEVICE FOR CONTROLLING A TOUCH SCREEN

FIELD OF THE INVENTION

Some embodiments relate to a method and a computer device for controlling a touch screen.

BACKGROUND OF THE INVENTION

There exist many types of computer device where the display is controlled by an input. The input may be a cursor or pointer that is controlled by a human interface device such as a mouse, joystick, keyboard etc. Increasingly, the display may comprise a touchscreen which can be controlled by a user's touch. That is, activation of functions or objects are responsive to user input made by way of the user touching the screen.

There is a genre of computer implemented games which are sometimes referred to as shooter games such as first person shooters or third person shooters. In a shooter games, the shooter is represented by an image appropriate to the game. These type of games are often played on PCs or dedicated gaming platforms such as Xbox (Registered Trade Mark) or PlayStation (Registered Trade Mark). To control the position and/or actions of the image representing the shooter a control device such as a key board or joy stick is typically used. These types of device operate using two handed control. For example, one hand controls shooting and another hand controls movement.

However, attempts to provide these types of games on mobile devices such as phones and tablets have not been as popular as the versions which are provided on PCs or dedicated gaming devices. One of the issues which is technically challenging is the control of the position and/or actions of the image representing the shooter. Some such games when provided on a mobile device or tablet have a joystick type function replicated on the touch screen. For example "buttons", virtual joysticks or the like are displayed on the screen and the user selects one or more of these buttons to control the actions of the image of the shooter. Again one hand will control shooting and the other hand will control movement.

In such scenarios, a technical problem exists with the user interface in that the user may have a problem in contacting a precise area on the small screen as the user's finger is relatively large relative to the screen. Additionally, the providing of the "buttons" or the like takes up a significant proportion of the user interface which reduces the amount of user interface available for displaying game images.

Another technical challenge presented by providing a computer implemented game on a device such as a smart phone or the like is that sometimes two concurrent actions need to happen. For example, the action and movement of the shooter. For example, these actions may be the aiming in the desired direction and the shooting/combat actions. This can be simply achieved with a joystick in a dedicated game device. However, there is a technical challenge when providing these concurrent actions on a smart phone.

This patent specification describes not only various ideas and functions, but also their creative expression. A portion of the disclosure of this patent document therefore contains material to which a claim for copyright is made and notice is hereby given: Copyright King.com Limited 2018 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to an aspect, there is provided a computer device comprising: a touch screen configured to receive a series of inputs from a user, each of the inputs comprising a single touch input of the user; and at least one processor configured to cause the touch screen to display a computer implemented game on the touch screen, the computer implemented game comprising at least one game object controlled by the series of inputs, the at least one processor configured to cause the game object to perform a first action in response to at least one first touch in the series of inputs and to perform a second different action in response to at least one second touch in the series of inputs, wherein the first and second actions are caused to be performed by the game object one in conjunction with the other.

The first action may be configured to control where the game object is moved to and the second action may be configured to control how the game object moves.

The first action may be configured to control where the game object is moved to and the second action may be performed while the game object moves.

The first action and the second action may be provided one in parallel with the other.

One of the first action and the second action may modify the other of the first and second action to provide a combined action.

The touch screen may be configured such that at least a plurality of the series of inputs is provided in a same area of the touchscreen.

The at least one processor may be configured to cause a game area to be displayed on the touchscreen, the game object being provided in the game area, the touch screen being configured to receive at least one of the series of inputs in the displayed game area.

At least one of the inputs may be provided at a location in the game area, the location being used to define a waypoint and the at least one processor may be configured to guide the game object from a current location of the game object to the waypoint, as one of the first and second actions.

At least one of the series of inputs may comprise one or more of: a swipe across the touch screen, one or more taps on the touch screen; and a touch of the touch screen.

One of the first and second actions may comprise control of a camera angle, the camera angle configured to control an image of the computer implemented game which is displayed on the touchscreen.

For at least one input of the series of inputs, an associated action may be dependent on a direction associated with the respective input.

At least one of the series of inputs may comprise a swipe and an associated action may comprise control of a camera angle, the camera angle being configured to control an image of the computer implemented game which is displayed on the touchscreen, whereby a direction of the swipe controls a direction of the camera angle.

One of the first and second actions may be configured to control which part of an environment of the computer implemented game is displayed on the touch screen.

One of the first and second actions is configured to control a camera angle with respect to the game object about at least one axis defined with respect to the game object.

A characteristic of at least one input of the series of inputs may be compared with a threshold to determine an associated action.

The characteristic may comprises one or more of a distance moved on the touchscreen by a respective input, a length of time a respective input is provided on the touchscreen and a speed of a respective input with respect to the touch screen.

At least one input may comprise a first number of taps with respect to the touch screen providing one action and at least one input may comprise a second number of taps with respect to the touch screen providing another action.

At least one of the first and second actions may be caused to be performed by the game object at a location on the touch screen where one or more of the respective inputs is received.

At least one input may be configured to provide a plurality of actions.

The first action may be to select a target and the second action may be to shoot a selected target.

One of the inputs may comprise one or more taps at a location on the touch screen, the location on the touch screen representing a destination in an image displayed on the touch screen, and the first and second actions comprise selecting the destination and causing the game object in the image displayed on the touch screen to move from a current location to the destination, wherein movement of the game object to the destination being dependent on at least one of the number of taps and a rate of the taps.

According to another aspect, there is provided a computer implemented method for controlling a touch screen of a computer device, the device comprising the touch screen and at least one processor, the method comprising: receiving via the touch screen a series of inputs from a user, each of the inputs comprising a single touch input of the user; causing by the at least one processor the touch screen to display a computer implemented game on the touch screen, the computer implemented game comprising at least one game object controlled by the series of inputs; and causing the game object to perform a first action in response to at least one first touch in the series of inputs and to perform a second different action in response to at least one second touch in the series of inputs, wherein the first and second actions are caused to be performed by the game object one in conjunction with the other.

The first action may control where the game object is moved to and the second action may control how the game object moves.

The first action may control where the game object is moved to and the second action may be performed while the game object moves.

The first action and the second action may be provided one in parallel with the other.

One of the first action and the second action may modify the other of the first and second action to provide a combined action.

The method may comprise receiving at least a plurality of the series of inputs in a same area of the touchscreen.

The method may comprise causing a game area to be displayed on the touchscreen, the game object being provided in the game area, and receiving at least one of the series of inputs in the displayed game area.

At least one of the inputs may be provided at a location in the game area, the location being used to define a waypoint and the method may guiding the game object from a current location of the game object to the waypoint, as one of the first and second actions.

At least one of the series of inputs may comprise one or more of: a swipe across the touch screen, one or more taps on the touch screen; and a touch of the touch screen.

One of the first and second actions may comprise control of a camera angle, the camera angle configured to control an image of the computer implemented game which is displayed on the touchscreen.

For at least one input of the series of inputs, an associated action may be dependent on a direction associated with the respective input.

At least one of the series of inputs may comprise a swipe and an associated action may comprise control of a camera angle, the camera angle being configured to control an image of the computer implemented game which is displayed on the touchscreen, whereby a direction of the swipe controls a direction of the camera angle.

One of the first and second actions may be configured to control which part of an environment of the computer implemented game is displayed on the touch screen.

One of the first and second actions is configured to control a camera angle with respect to the game object about at least one axis defined with respect to the game object.

The method may comprise comparing a characteristic of at least one input of the series of inputs with a threshold to determine an associated action.

The characteristic may comprises one or more of a distance moved on the touchscreen by a respective input, a length of time a respective input is provided on the touchscreen and a speed of a respective input with respect to the touch screen.

At least one input may comprise a first number of taps with respect to the touch screen providing one action and at least one input may comprise a second number of taps with respect to the touch screen providing another action.

At least one of the first and second actions may be caused to be performed by the game object at a location on the touch screen where one or more of the respective inputs is received.

At least one input may be configured to provide a plurality of actions.

The first action may be to select a target and the second action may be to shoot a selected target.

One of the inputs may comprise one or more taps at a location on the touch screen, the location on the touch screen representing a destination in an image displayed on the touch screen, and the first and second actions comprise selecting the destination and causing the game object in the image displayed on the touch screen to move from a current location to the destination, wherein movement of the game object to the destination being dependent on at least one of the number of taps and a rate of the taps.

According to an aspect, there is provided a computer readable non-transitory storage medium carrying one or more computer executable instructions which when run on at least one processor cause: receiving by a touch screen a series of inputs from a user, each of the inputs comprising a single touch input of the user; displaying by the touch screen of a computer implemented game, the computer implemented game comprising at least one game object controlled by the series of inputs; and performing by the game object a first action in response to at least one first touch in the series of inputs and a second different action in response to at least one second touch in the series of inputs, wherein the first and second actions performed by the game object one in conjunction with the other.

According to another aspect, there is provided a computer device comprising: a touch screen configured to receive a plurality of different inputs from a user, each of the different inputs comprising an single input of the user, the single inputs comprising one or more of tapping, swiping and touching a location on the touch screen; and at least one processor configured to cause the touch screen to display a computer implemented game on the touch screen, the computer implemented game comprising at least one game object controlled by the plurality of different inputs, the at least one processor configured to cause different actions in the computer implemented game in response to different ones of the different inputs.

According to another aspect, there is provided a computer device comprising: a touch screen configured to receive an input comprising one or more taps at a location on the touch screen, the location on the touch screen representing a destination in an image displayed on the touch screen; and at least one processor configured, in response to the input, to cause a game object in the image displayed on the touch screen to move from a current location to the destination, the movement of the game object from the current location to the destination being dependent on at least one of the number of taps and a rate of the taps.

According to another aspect, there is provided a computer device comprising:

a touch screen configured to receive an input comprising a tap at a location on the touch screen, the location on the touch screen representing a destination in an image displayed on the touch screen; at least one processor configured, in response to the input, to cause a game object in the image displayed on the touch screen to move from a current location to the destination.

According to another aspect, there is provided a computer device comprising: a touch screen configured to receive an input comprising a plurality taps at a location on the touch screen, the location on the touch screen representing a destination in an image displayed on the touch screen; and at least one processor configured, in response to the input, to cause a game object in the image displayed on the touch screen to move from a current location to the destination, the movement of the game object from the current location to the destination being dependent on a rate of the taps.

According to another aspect, there is provided a computer device comprising: a touch screen configured to receive an input comprising a plurality taps at a location on the touch screen, the location on the touch screen representing a destination in an image displayed on the touch screen; and at least one processor configured, in response to the input, to cause a game object in the image displayed on the touch screen to move from a current location to the destination, the game object being caused to make a roll from the current location towards the destination.

According to another aspect, there is provided a computer device comprising: a touch screen configured to receive an input comprising a plurality taps at a location on the touch screen, the location on the touch screen representing a destination in an image displayed on the touch screen; and at least one processor configured, in response to the input, to cause a game object in the image displayed on the touch screen to move from a current location to the destination, the game object being caused to slide from the current location towards the destination.

According to another aspect, there is provided computer device comprising: a touch screen configured to receive an input comprising a movement across the touch screen, the movement being in a direction; and at least one processor configured, in response to the direction of input, to cause an image which is displayed on the display to change to represent a changed camera angle.

A computer device comprising: a touch screen configured to receive an input comprising a movement across the touch screen, the movement being in a direction; and at least one processor configured, in response to at least one of a direction of input and the speed of input, to cause an action to be provided.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

To understand some embodiments, reference will now be made by way of example only to the accompanying drawings, in which.

and

Figure 12:
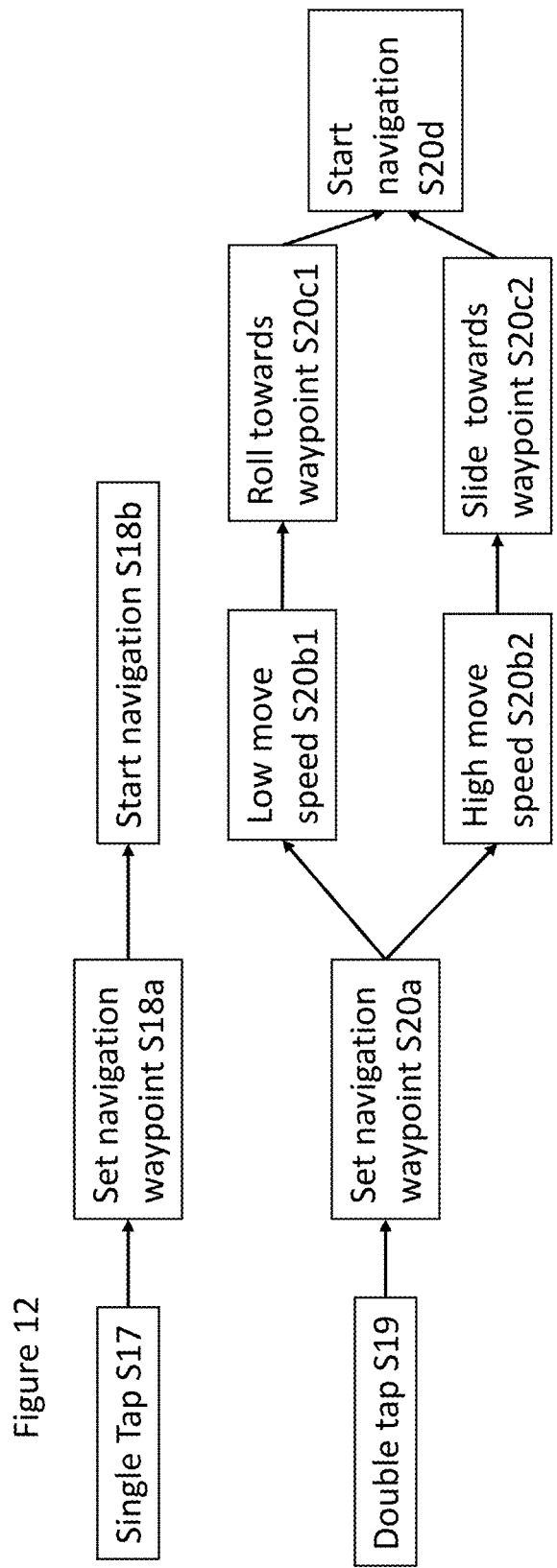

FIG. 12 shows an example of a method flow options when there is a tap.

DETAILED DESCRIPTION OF THE INVENTION

A person skilled in the art will realise that the different approaches to implementing the invention are not exhaustive, what is described herein are certain example embodiments.

The illustrated example embodiments may provide an improved user interface in the context of a computer implemented game.

Figure 1:
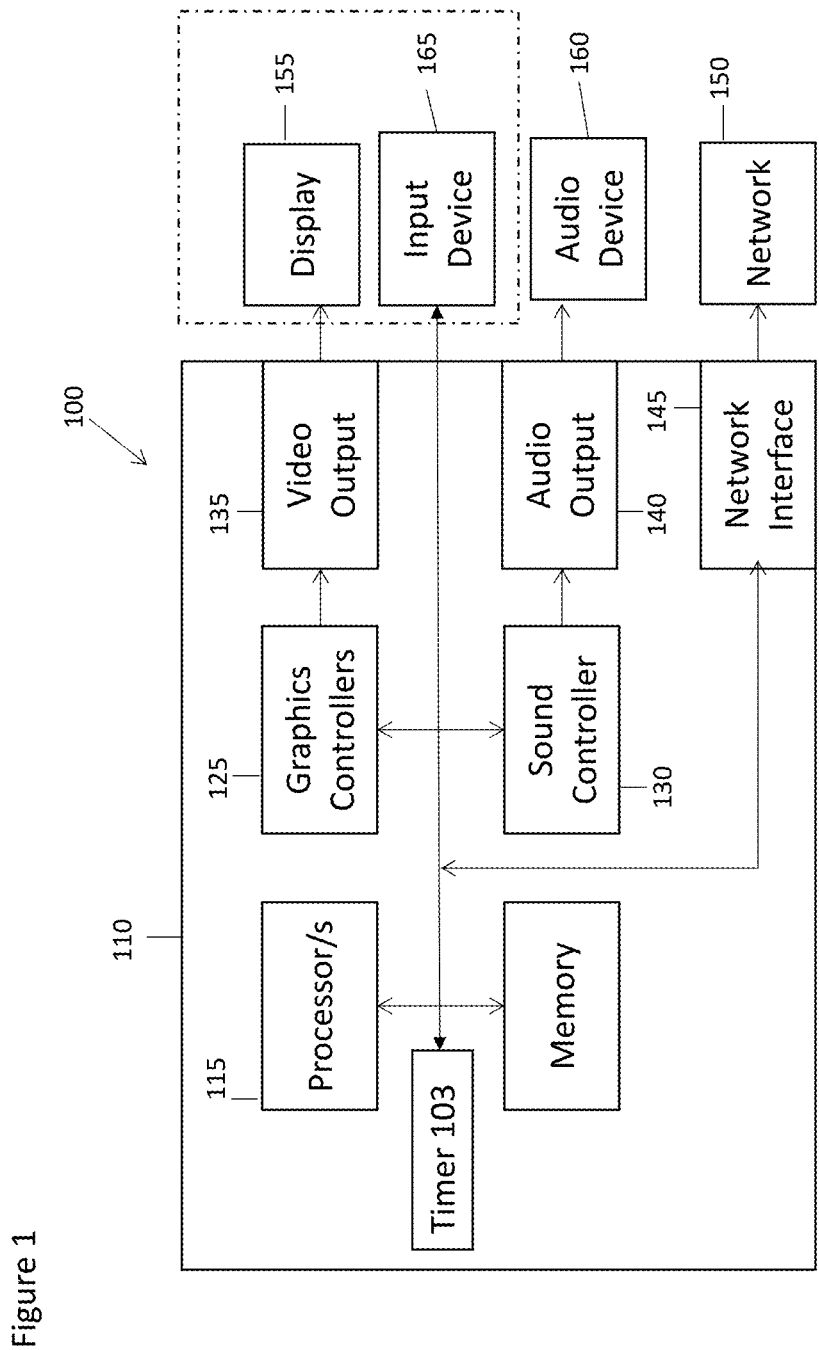
FIG. 1 shows an example device in which some embodiments may be provided.

A schematic view of a user device 100 according to an embodiment is shown in FIG. 1. All of the blocks shown are implemented by suitable circuitry. The blocks may be implemented in hardware and/or software. The user device may have a control part 110. The control part 110 has at least one processor 115. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio out 140 is provided to an audio device 160 such as a speaker and/or earphone(s).

The device 100 has an input device 165. The input device is a touch screen. It should be appreciated that the display 155 may in some embodiments also provide the input device 165 by way of an integrated touch screen for example, as schematically indicated by the dotted outline around the display 155 and the input device 165.

The device comprises a timer or clock function 103. This may be a count up timer and/or a countdown timer. The timer may be a hardware timer, a software timer or a combination of a hardware and a software timer. The timer may be a separate timer and/or be implemented by the at least one processor in association with appropriate program code. As will be discussed later this may be used to determine a length of time for which a user has continuously touched the touch screen. This timer may alternatively or additionally be used to determine a speed of a movement of a user's finger across the touch screen.

The blocks of the controller 110 are configured to communicate with each other by an interconnect such as a bus or any other suitable interconnect and/or by point to point communication.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
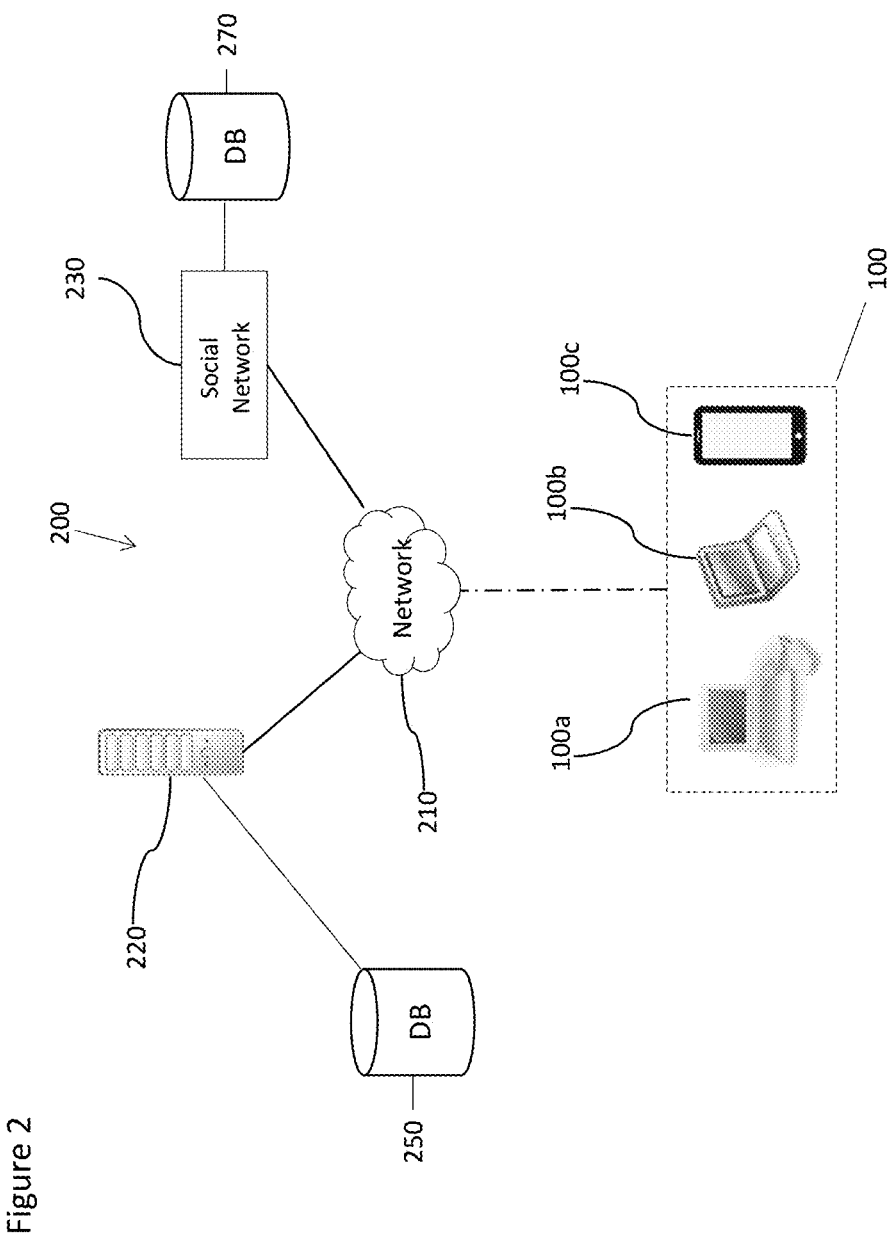
FIG. 2 shows a system in which some embodiments may be provided.

FIG. 2 schematically shows a system 200 according to an embodiment. The system 200 comprises a server 220 which may store or be in communication with database 250 which may store game player's details, profiles, statistics etc. In practice, one or more databases 250 may be provided. Where more than one server 220 is provided, the database(s) 250 may be provided in one server 220 or across two or more servers. The server 220 may also have a games data function. This may comprise one or more units of memory to store the computer game program, user behaviour data and a processor to run the games program and process the user behaviour data.

The server 220 may communicate via, for instance, the internet 210 or other network to one or more client or user devices 100, shown in FIG. 2 by way of example as user devices 100a, 100b and 100c, and may further provide connections to a social network 230, for example, Facebook™. The social network 230 may also be connected to a database 270 storing social user interaction details, for instance, user to user interaction maps, friend lists, location history etc. In practice, one or more databases 270 may be provided. It should be appreciated that the connection to the social network is optional in some embodiments.

It should be appreciated that embodiments may be deployed in different system architectures. For example, the computer game may be implemented as a computer game that is stored in the memory of the user device and is run on the processor of the user device. However, the server 220 may handle some elements of the game in some embodiments. By way of example only, a Java game applet may be provided to the user device 100 and the locally running Java applet will generate, for example, the graphics, sounds, and user interaction for the game play on the user device. Some data may be fed back to the server to allow interaction with other players. The data which is fed back may alternatively or additionally allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

It should be appreciated that some embodiments may be provided as stand-alone games on the user device.

Figure 3:
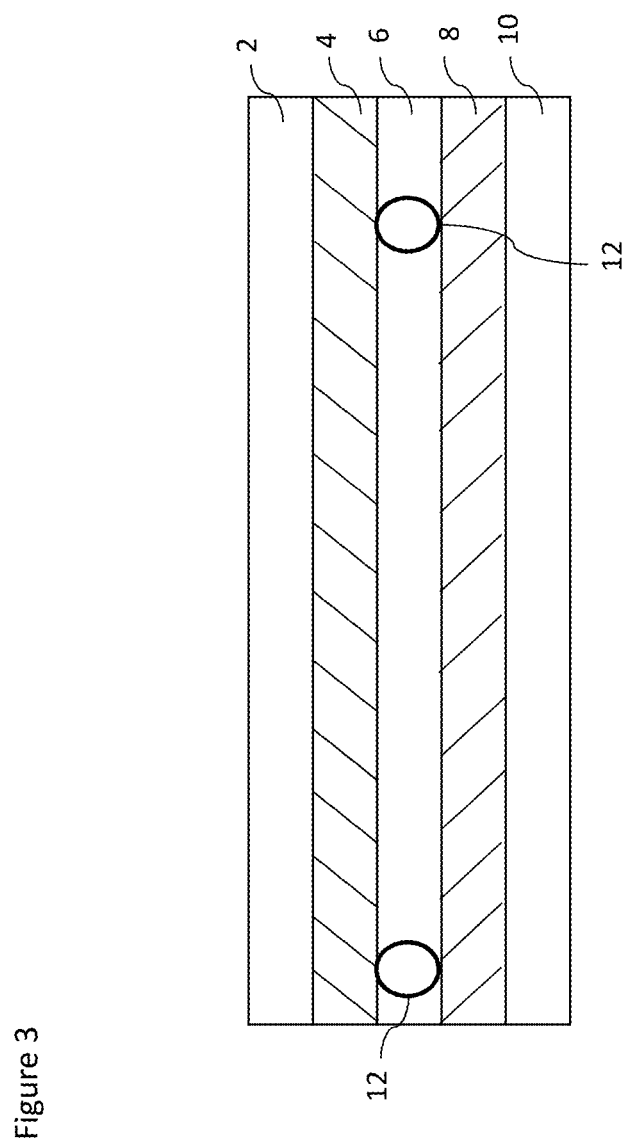
FIG. 3 shows a cross section of part of a touch screen display.

Reference is made to FIG. 3 which schematically shows a touch screen. The touch screen may incorporate any suitable touch screen technology. One example of a touch screen technology is the so-called resistive touch screen technology.

The front layer or surface 2 of the touch screen is typically made of a scratch-resistant, flexible plastic or similar. A thin film or coating 4 of conductive material is provided on the underside of the front surface. The film of conductive material can be of any suitable material and may for example be Indium Tin Oxide. A gap 6 is provided. This gap may be created by suitable spacers 12. The gap may be an air gap. A second layer of material is provided. That layer may be of glass or hard plastic. The second layer 10 is also provided with a thin film or coating 8 of conductive material on the side of the second layer facing the spacing. The coating may be of any suitable material and may also be Indium Tin Oxide. Thus, the two layers 2 and 10 are kept apart by the spacers 12 which may be arranged at regular intervals. The thin conductive films or coatings are arranged to provide electrical resistance. The arrangement is such that the electrical charge runs in one direction on the one conductive coating or film and in a perpendicular direction on the other conductive coating or film.

With a resistive touch screen, when the screen is touched, the plastic deforms so that the two conductive films meet. By measuring the resistance of the two conductive films or coatings, the touch position can be accurately determined.

It should be appreciated that this is one example of a touch screen. Another technology often used for touch screens is capacitive technology. The structure of the touchscreen is similar to that described in relation to FIG. 3. However, the first layer may typically be glass, and thus not flexible. The conductive coatings may be a uniform layer, a grid or parallel stripes running at right angles to each other on the two layers. A capacitive arrangement is formed by the two conductive coatings separated by the insulating material (air). When the finger comes close to a capacitor, it changes the local electrostatic field. The touchscreen effectively is made up of a large number of tiny capacitors. The system is arranged to monitor each of these tiny capacitors to determine where the finger touches the screen. Capacitive touch screens have the advantage that it is possible to determine several discrete touch points at the same time.

It should be appreciated that embodiments may be used with any suitable touch screen technology.

Embodiments may be particularly applicable for games which are to be played on devices which have a relatively small screen, such as smart phones and some smaller tablets. However, it should be appreciated that other embodiments may be used with devices having larger screens.

Some embodiments may provide an improved user interface which may allow a user to navigate a 2D or a 3D virtual world. This may be in the context of a shooter type game or in the context of any other suitable game genre.

The shooter game may be a first or third person shooter game or any other suitable genre of shooter game.

Some embodiments may allow the user to navigate the virtual world and/or perform actions using a single finger input or touch on a touchscreen user interface.

The user input whilst only being provided by a single finger is nevertheless able to provide a series of actions. These series of actions may be similar those achieved using for example a two handed joystick.

In some embodiments the user is able to control the user interface using a single finger to navigate a 2D or 3D world while being able to aim and shoot or perform any other suitable action. It should be appreciated that the user could of course use more than one finger but in some embodiments only one interaction with the user interface is required at a time with each interaction only requiring a single finger.

As will be discussed a touch or input may take any suitable form and may comprise the user tapping the touchscreen or dragging (swiping) their finger across the touchscreen in order to move a user controlled entity. It should be appreciated that the touch may be via a user's finger or by using a stylus or the like. In some embodiments, the user will need to physically touch the touch screen in order to cause the interaction. In other embodiments, the user's interaction may need only to be in close proximity to the touchscreen in order to cause the interaction. It should be appreciated that the term "touch" is it intended to cover any or all of these scenarios which result in a user input being detected by the touchscreen.

As mentioned, some known arrangements seek to mimic a joystick functionality on the touch screen. This type of functionality will have defined areas which are used to control a game object. The defined areas are provided outside the area on the screen which displays game play. This type of implementation reduces the amount of the display which is available to display game play. This is a problem where the game is for example played on a smart phone or tablet.

In contrast, in some embodiments, the user utilizes the same area of the display used to display game play as to provide control inputs.

In some embodiments, the user is able to provide a series of inputs to the same area of the touchscreen. This may for example allow a user to hold a smart phone or similar device in one hand and use the thumb of the hand holding the smart phone to provide the series of inputs. The user may alternatively hold the smart phone in one hand and use a finger of another hand to provide the series of inputs.

In some embodiments, the same area may be a defined area on the touchscreen. In other embodiments, the same area may be any suitable area on the touchscreen. It should be appreciated that the same area is such that in a first touch a first set of pixels of the touch screen is activated and in a second touch of the series a second set of pixels is activated. There may be an overlap between the first set pixels and the second set of pixels. In some embodiments, there is a substantial overlap between the first and second of pixels.

It should be appreciated that in other embodiments, different areas may be used to provide two or more inputs of the series of inputs where there may be no or little overlap of the pixels activated by the respective inputs.

In some embodiments a series of single touch actions is used to provide a complex action. A complex action may be one where a game object is controlled to perform a first action and at the same time is controlled to provide a second action. The first and second actions may be related such as move towards a particular location being the first action and roll when moving being the second action. In other embodiments, the first and second action may be separate and both be performed by the game object at the same time. For example the first action may be for a game object to move towards a target and the second action may be to shoot at a target.

The sequence of inputs consist of a series of two or more inputs which are input one after another but may emulate the joystick type input in the sense that the complex action which results is as if the necessary controls for providing that action were input at the same time.

Some embodiments allow concurrent actions to be performed in a synchronous manner but allows the user to input the associated controls for the concurrent actions sequentially. The computer program when run, may make the interpolation between those actions creating that synchronicity In some embodiments, one action may be to set a waypoint towards which the game object moves. The next input may control what the game object does as it moves to the waypoint or how the game object moves towards that waypoint.

It should be appreciated that in some embodiments, a complex action may be made up of two or more individual actions.

In some embodiments, the sequence of inputs may comprise two or more inputs. Each action may be defined by one or more inputs of that sequence.

Figure 4:
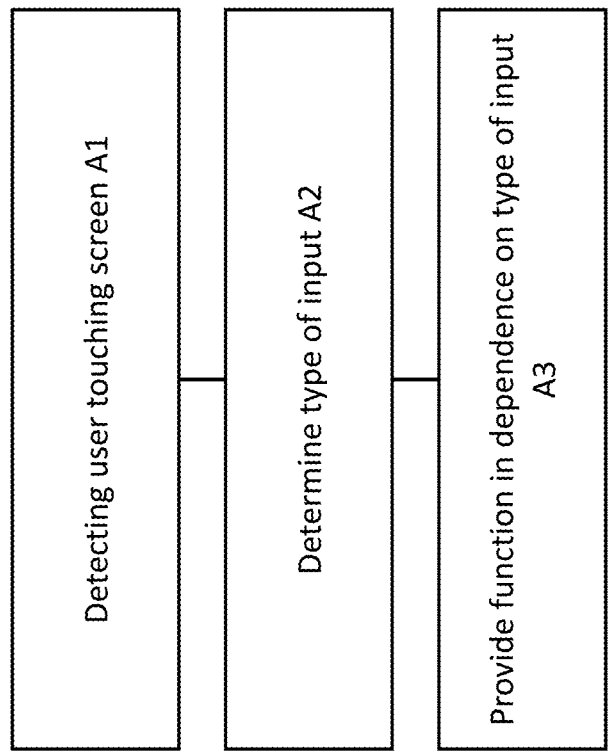
FIG. 4 shows a general flow according to some embodiments.

A method of some embodiments will now be described with reference to FIG. 4.

In step A1, an input in the form of a touch by a user's finger on the touch screen is detected.

In step A2, the at least one processor is configured to determine the type of input provided by the user's finger. For example, is the input a swipe and optionally in what direction, a tap and optionally how many taps, or a press. It should be appreciated that in some embodiments, there may be a plurality of different possible types of input.

In step A3, the function which is associated with the determined input is provided. It should be appreciated that the function may be provided whilst the input is still being provided or may be provided after the input has been completed. This may be dependent on one or more of the function being provided and the type of input.

Figure 5:
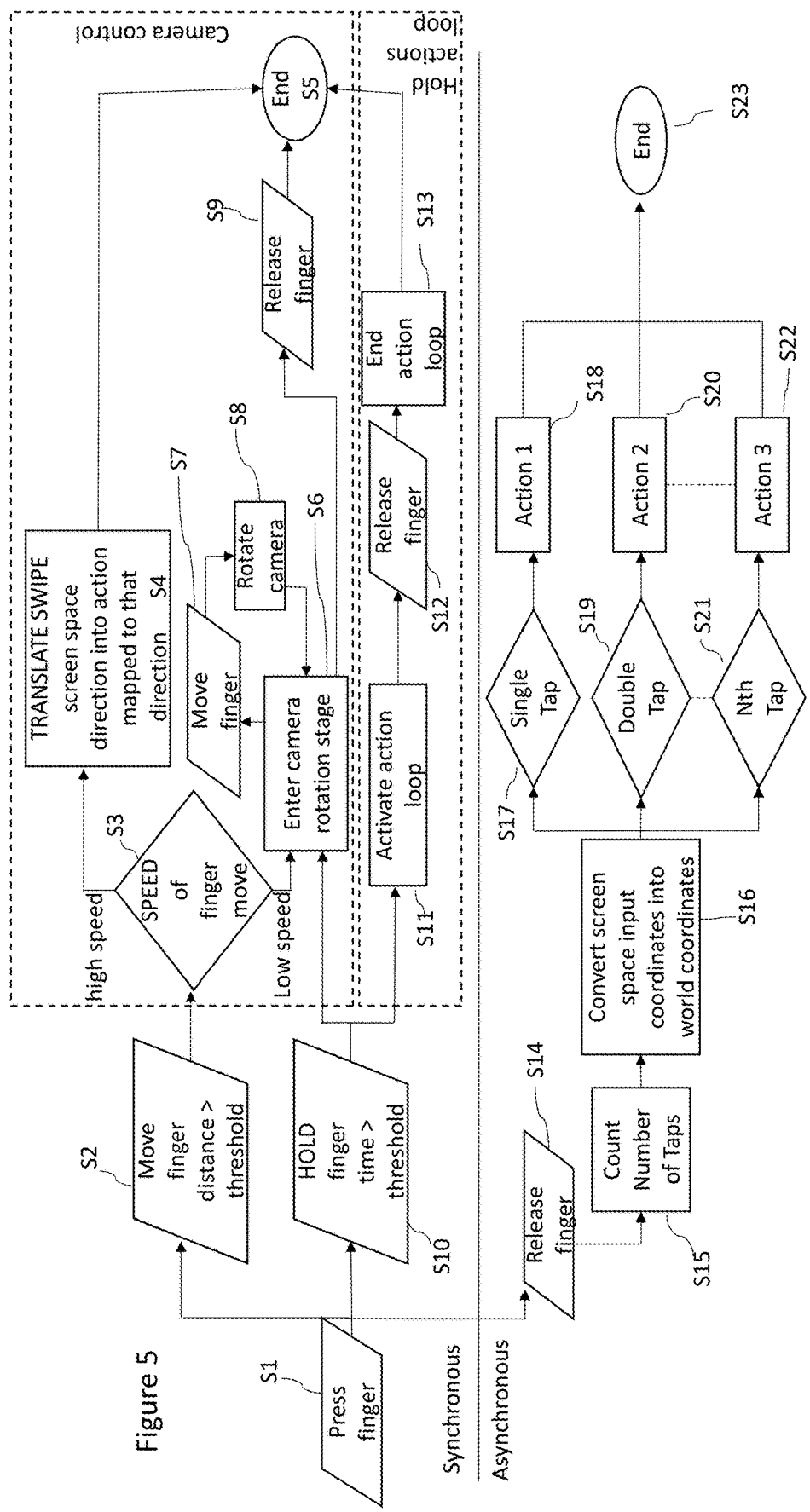
FIG. 5 shows an example flow according to some embodiments.

Reference is made to FIG. 5 which shows a more detailed example of a method of some embodiments.

In step S1, an initial user input in the form of a touch on the user interface is detected. This may be a press on the touch screen or the like.

In step S2, it is determined by the at least one processor if the user's finger has moved more than a threshold distance across the user interface. This may be to determine if the user has made a swipe type movement.

If so, then the next step is step S3 in which it is determined if the speed of the movement of the finger is a relatively high speed movement or a relatively low speed movement. In some embodiments, this may be determined by determining the speed of the finger and comparing the determined speed to a threshold. If the speed is greater than the threshold, then the finger is determined to be moving at a relatively high speed and if the speed is less than the threshold, then it is determined that the speed of the finger is determined to be a relatively low speed. It should be appreciated that if the speed is the threshold speed, then depending on design of the system, the finger can be determined either to be moving at the relatively high speed or the relatively low speed.

It should be appreciated that in some embodiments, the speed information may be inferred. For example the speed information may be determined based on the number of capacitors fired or based on one or more touch screen parameters such as change in determined resistance and/or the like.

If it is determined that the speed is high, then the next step is step S4. In this step, the movement is mapped by the processor to that action. It should be appreciated that in some embodiments, the direction of the movement is determined and the action which is taken will be dependent on the direction of the movement. One or more of the direction of the movement, the start position of the movement, the end position of the movement, the speed of the movement and the path of the movement is used to determine one or more of the action to be taken and the location of the action taken with respect to the screen.

The appropriate action will be provided in the computer implemented game displayed on the touch screen.

It should be appreciated that the method will then proceed to step S5 in which the method is ended. It should be appreciated that after step S5 or instead of step S5, one or more actions may be triggered.

If it is determined in step S3, that the speed is low, then the next step is step S6. The action appropriate to the low speed movement is taken. One or more of the direction of the movement, the start position of the movement, the end position of the movement, and the path of the movement is used to determine one or more of the action to be taken and the location of the action taken with respect to the screen.

By way of example only, in this embodiment, the action will be to enter a camera rotation mode. The camera may be rotated about any suitable axis. In a camera rotation mode, the user is able to change the image which is displayed on the touch screen. In the context of for example a first person or third person shooter game, this allows the user to look round the 2D or 3D world to change the direction which is viewed, for example from the perspective of the first or third person.

As the user moves their finger in step S7, this movement is used to control the direction in which the camera rotates or moves in step S8. Steps S6, S7 and S8 are repeated until it is determined that the user has released (removed it from the screen) their finger in step S9.

It should be appreciated that if the user pauses in their movement but still keeps their finger on the touch screen, the camera rotation mode is still selected but the camera is static. The camera will be rotated when the user resumes the movement or the camera rotation mode will be ended if the user's finger is released When the user has released their finger, then step S9 is followed by step S5. It should be appreciated that after step S5 or instead of step S5, one or more actions may be triggered.

If after step S1, it is determined in step S10 that the user's finger has been held on the screen in generally the same place for more than a threshold amount of time, then the next step is step S11 and also step S6.

In step S11, an action associated with holding the finger on the screen for more than a threshold amount of time is taken. In some embodiments, the location of the action which is taken may be controlled by the position of the touch by the user on the touch screen. The action may be a shooting or the like action.

It is determined in step S12 that the user has released their finger. In step S13, when the user has released their finger from the screen, then the action which is started in step S11 is ended. Step S13 is then followed by step S5. It should be appreciated that after step S5 or instead of step S5, one or more actions may be triggered. For example in the case that the action of step S11 is shooting, the triggered action may be reloading of a weapon.

It should be appreciated that steps S2 to S13 may be regarded as providing synchronous control where there is a one to one relationship between the interactions on the screen with the resulting action in the computer implemented game. For example, as the user moves their finger, the camera pans.

The following steps may be regarded as provided asynchronous control in the sense that for example a tap will subsequently cause the character to move on the screen.

After step S1, it is determined in step S14 that the user has effectively tapped the screen. This is where the user's finger has been held on the screen for less than a threshold amount of time.

In step S15, it is determined how many taps are made.

In step S16, the position of the taps are determined and converted into a location or coordinates in the computer implemented game world.

If is determined that there is a single tap in step S17, then the action associated with the single tap is provided in step S18. Likewise if it is determined in step S19 that there is a double tap, then the action associated with a double tap is provided in step S20. Generally if is it is determined that there are N taps in step S21, then the action associated with N taps is provided in step S22.

It should be appreciated that N may be one or more. Where N is one, steps S19 and S21 may be omitted. Likewise, where N is two, then step S21 may be omitted. In some embodiments, if N is two, steps S17 and S21 may be omitted. That is the number of taps is used to select an action from a list of actions 1-Action 1, 2-Action 2, 3-Action 3 . . . . N-Action Nth and execute that action. In other embodiments, that action and all the previous actions are selected and executed.

Each of steps S18, S20 and S22 may be followed by step S23 when the action has been provided. The method is ended in step S23. It should be appreciated that after step S23 or instead of step S23, one or more actions may be triggered.

It should be appreciated that the actions which are taken in response to particular user inputs may be dependent on the game being played. One or more of the steps of FIG. 5 may be omitted. It should be appreciated that one or more different actions may be provided in response to one or more of the example user interactions. One or more different user interactions may be provided in other embodiments.

Some example swiping inputs with associated actions will now be described by way of example.

The character performs a melee attack that will depend on the distance to an enemy character. (For example in step S4). This may be a swipe up movement.

The camera view will rotate 180 degrees around a vertical axis of the displayed image. This may be a swipe down movement.

The camera view will rotate around the vertical axis in the direction of the swipe. The amount of rotation may depend on the speed and/or distance of the swipe action. This may be a swipe left or right action. This may be steps S6 to S8.

Figure 9A:
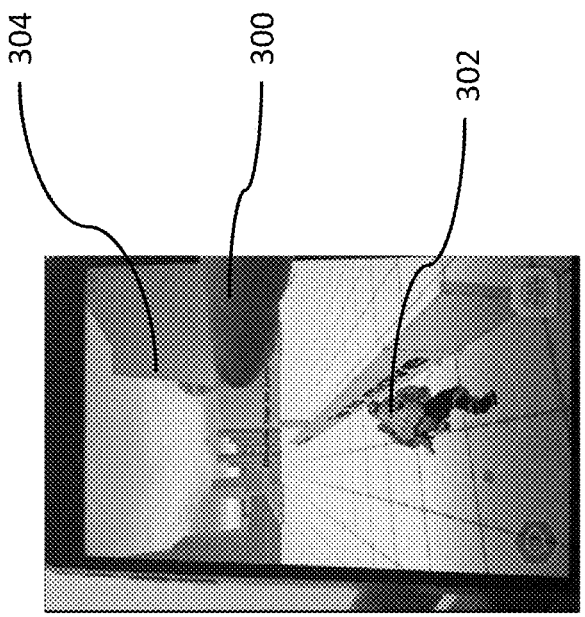
FIGS. 9A and 9B show examples of a user interface when a user swipes his finger across the user interface to pan a camera.
Figure 9B:
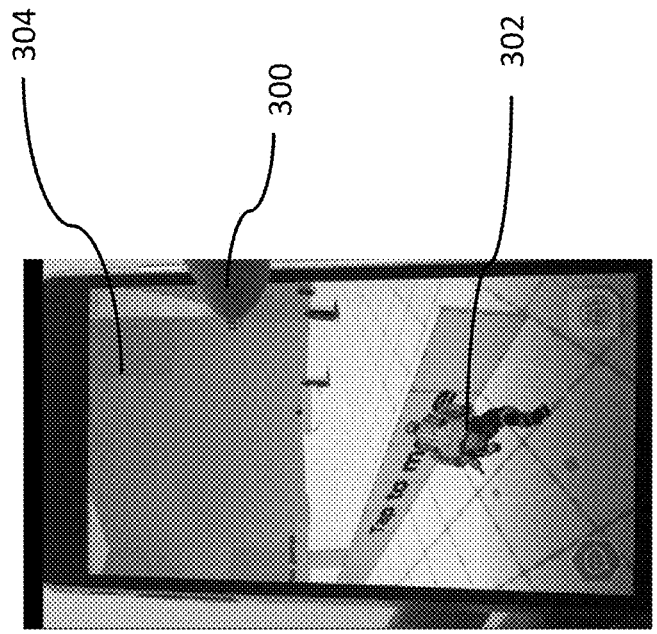

In this regard, reference it made to the example embodiments shown in FIGS. 9A and 9B which shows the user interface 304 as the user swipes his finger 300 from left to right, as the camera view rotates around the vertical axis. The character 302 is displayed on the user interface.

One example of the activated action loop of step S11 will now be described

If there is an enemy target selected or within a certain angle range the camera will rotate around the vertical axis to center the target on the screen.

At the same time, the camera will zoom in over one of the shoulders of the character and take an aiming pose.

The character will start shooting with the selected weapon, reloading when needed and resuming shooting. The camera pan stage actions will continue being executed to move the camera around. These steps are repeated until the user's finger is removed from the touch screen.

If after a few seconds the shooting is not resumed by entering again the action loop of step S11, the character will start reloading his weapon.

Figure 11:
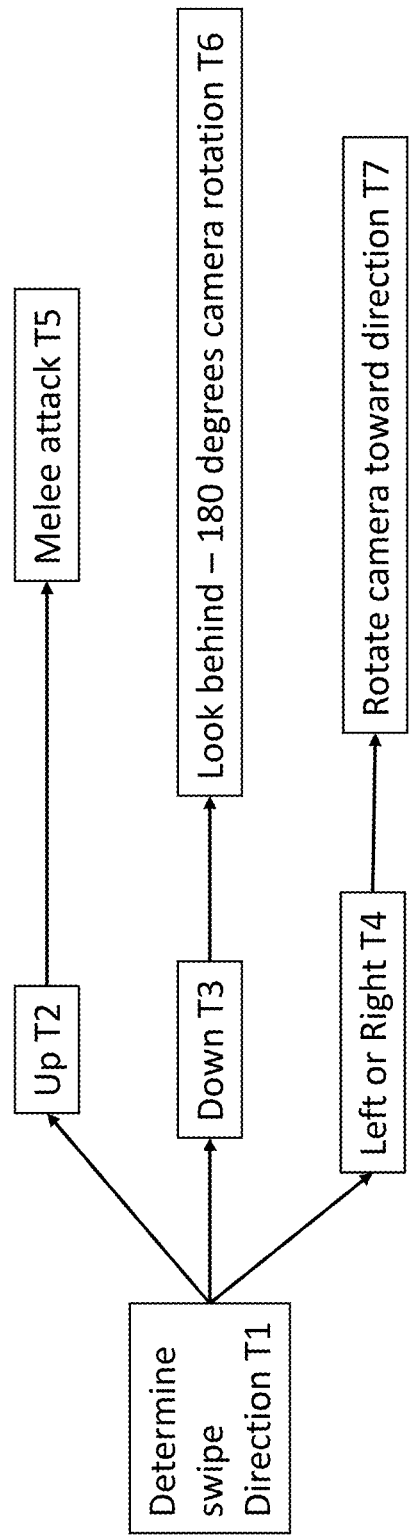
FIG. 11 shows an example of method flow options when there is a swipe.

Reference is made to FIG. 11 which shows an example of sub steps of the step referenced S4 in FIG. 5. In particular in sub step T1, the swipe direction is determined.

If it is determined that the swipe direction is up, as referenced by T2, then a melee attack (that is an attack at close quarters) is performed in sub step T5. The melee attack may depend on the distance to the target. The target may be represented by an enemy character.

If it is determined that the swipe direction is down, as referenced by T3, then a look behind action is performed in sub step T6. In this sub step, the camera will rotate by 180 degrees. This may be with respect to the vertical axis.

If it is determined that the swipe direction is left or right, as referenced by T4, then a rotation of the camera in the swipe direction is performed in sub step T7. This may be around the vertical direction in the direction of the swipe. The amount of rotation may be dependent on one or more of the speed and distance of the swipe action.

Reference is made to FIG. 12 which shows an example of steps constituting the actions S18 and S20 of FIG. 5.

The step S17, which is the determination of a single tap is followed by Step S18a which is the setting of a navigation waypoint. This will occur if it is determined that the specified world coordinates are a valid waypoint. If the specified coordinates are a valid waypoint, then the waypoint is set up at the determined world coordinates.

This is followed by step S18b which is navigation to the set waypoint. The at least one processor is configured to move the game character or the like the like to the waypoint using a path finding algorithm or other suitable navigation algorithm.

The step S19 which is the determination of the double tap is followed by step S20a which is the setting of a navigation way point. This will occur if it is determined that the specified world coordinates are a valid waypoint. If the specified coordinates are a valid waypoint, then the waypoint is set up at the determined world coordinates.

It is determined if the double tap is a low speed or high speed.

If the tap is at a low speed as represented by S20b1, then the next step is step S20c1 which is rolling towards the waypoint. This is followed by step S20d which is navigation to the set way point if there is still some distance to the waypoint. This may be using the pathfinding or navigation algorithm.

If the tap is at a high speed as represented by S20b2, then the next step is step S20c2 which is sliding towards the waypoint. This is followed by step S20d which is navigation to the set way point if there is still some distance to the waypoint. This may be using the pathfinding or navigation algorithm.

In some embodiments, action or actions resulting from the one or more taps may be dependent on the context of the location of the touch on the touch screen. For example, in the context of the method of FIG. 5, the action may be at the point identified in S16. For example a game character may interact with the environment at the location of the world coordinates. How and what the interaction is will depend on what is provided at the particular location. For example, if there is a ladder at the world coordinates, the game object may climb the ladder. If there is an object at the world coordinates, the game object may pick up the object.

Figure 7:
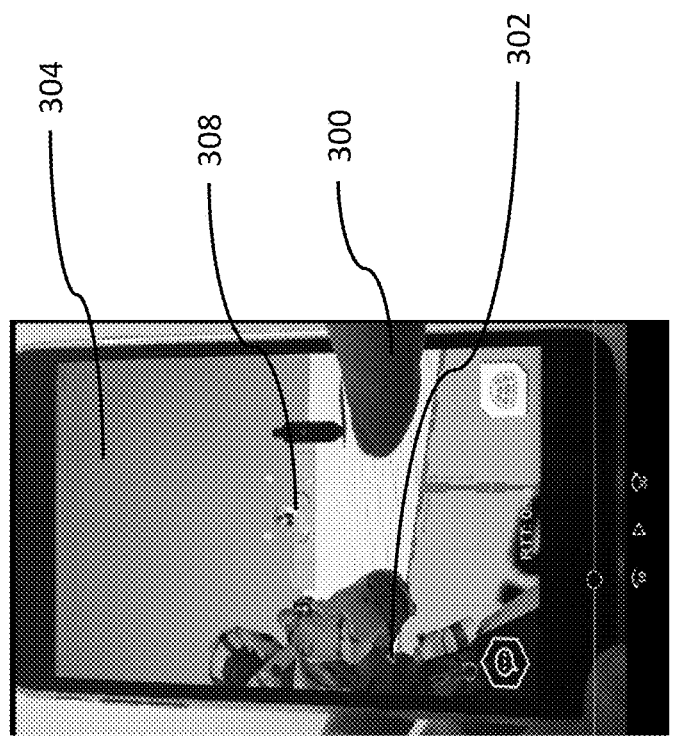
FIG. 7 shows an example of a user interface when a user holds his finger on the user interface to shoot.

Reference is made to FIG. 7 which shows the character 302 on the user interface 304 shooting at a target 308. As long as the user's finger is on the touch screen, the character will shoot at the target. The selection of the target is controlled by panning the camera. When a target is selected, it will be highlighted in any suitable way. Thus as the camera is panned, different targets are selected.

In some embodiments, if there is a double tap, the action of step S18 will comprise of the following steps:

Identify whether the specified world coordinates are a valid waypoint and go to next step if that is the case. If the waypoint is close to one or other sides of the character, the character will perform a roll movement and animation in that direction and end further actions. If not, a waypoint for the navigation system is set up at the defined world coordinates. The at least one processor will have a navigation function will move the character towards the waypoint using pathfinding.

Figure 6:
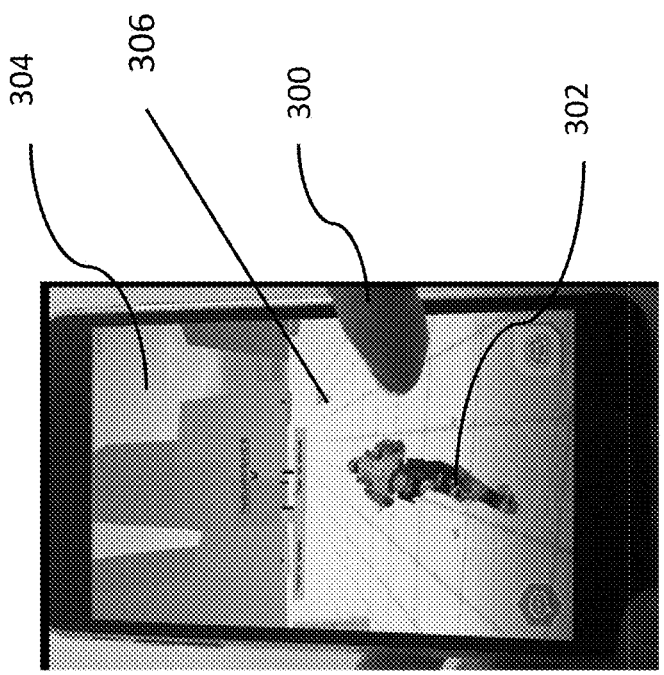
FIG. 6 shows an example of a user interface when a user makes a tap to move a character.

Reference is made to FIG. 6 which shows a character 302 being moved to a waypoint 306 on the user interface. The position of the waypoint is the position at which the user tapped the user interface with his finger 300. This may be a by a single tap.

Figure 10:
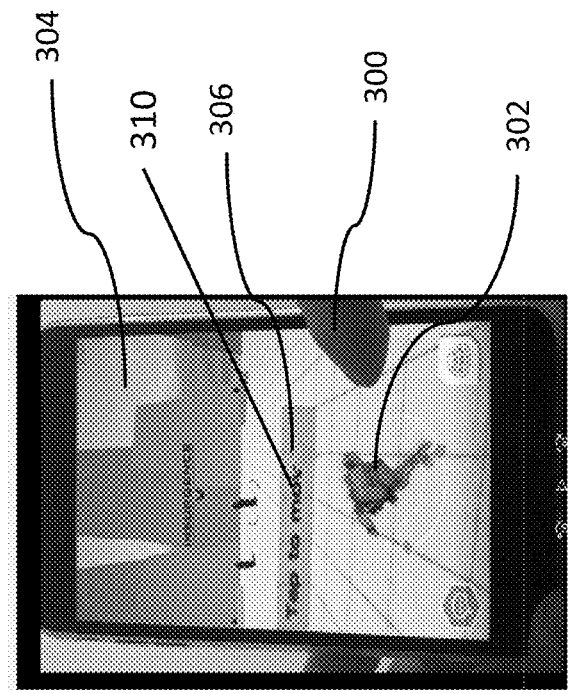
FIG. 10 shows an example of a user interface when a user makes a tap to move a character to a waypoint which is close an obstacle.

Reference is made to FIG. 10 which shows a user interface 304 where the user's finger has selected a waypoint 306 close to an obstacle 310. This will cause the character 302 to dive for cover as the character approaches the obstacle.

In some embodiments, if there is a double tap (for example a quick double tap), the action of step S20 will consist of the following steps:

Identify whether the specified world coordinates are a valid waypoint and if so sets up a waypoint for the navigations system at the defined world coordinates. The character is control to jump towards that waypoint. After landing from the jump if there is still some distance to the waypoint, the navigation system resumes the movement of the character towards the waypoint using pathfinding.

Figure 8:
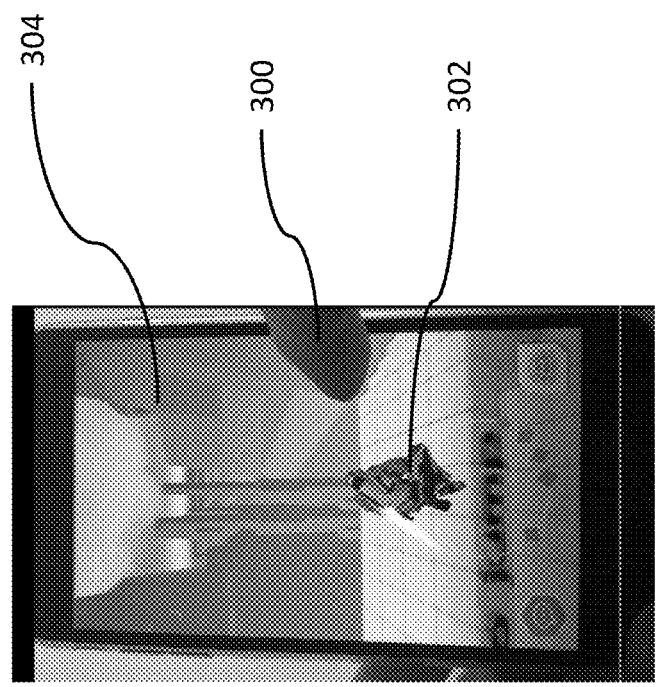
FIG. 8 shows an example of a user interface when a user makes a double tap to make a character jump.

Reference is made to FIG. 8 which schematically shows the user interface 304 with a character 302 being controlled to jump by the user's finger 300 being double tapped on the user interface.

It should be appreciated that these are examples of possible actions in response to possible inputs. In other embodiments different actions and/or input combinations may be provided.

It should be appreciated that FIG. 5 shows one example where a number of different actions are provided in response to a series of inputs. It should be appreciated that one or more of the inputs may be different, one or more of the provided actions may be different, one or more inputs may be omitted, one or more additional inputs may be omitted.

It should be appreciated that one or more of the steps of FIG. 5 may be omitted. Additionally or alternatively one or more additional steps may be provided. In some embodiments, the order of two or more steps may be changed.

In the above described embodiments, the computer implemented game has been described as being a shooter game. It should be appreciated that other embodiments may be provided in other genres of game. For example, some embodiments may be provided in other genres of game set in a 2D or 3D environment (or world) through which the user navigates and performs application specific actions using a single finger input on a touchscreen.

It should be appreciated that when the user's finger touches the touch screen, electrical signals will be generated by the touchscreen circuitry. This is as described for example in relation to FIG. 3. The electrical signals provide information as to the location where the user has touched the touchscreen, the duration of the touch and any movement.

The electrical signals are provided to the processing function of the user device. The processing function may comprise one or more processers and optionally may include one or more signal processing entities. The signal processing function will analyze the signals to determine the input as previously discussed.

For example, if an input has been a tap, the at least one processor is configured to determine the duration of the generated electronic signal. In some embodiments, the signal duration is compared to one or more signal duration thresholds. In some embodiments, either an upper signal duration or a lower signal duration threshold is used. The location of the tap may be taken into account. The one or more thresholds may be stored in memory. The comparison to the one or more thresholds may be performed by the processor running suitable computer executable code or may be performed by comparison circuitry.

The at least processor will determine the location of the user's input. The location of the user's touch on the touch screen is determined from the received electronic signals from the touch screen, as known in the art. It should be appreciated that the processing function may also use stored information as to the entity or entities being displayed on the display at the location associated with the touch input.

Various embodiments of methods and devices have been described in the foregoing. It should be appreciated that such may be implemented in apparatus, where the apparatus is implemented by any suitable circuitry. Some embodiments may be implemented by at least one memory and at least one processor. The memory may be provided by memory circuitry and the processor may be provided by processor circuitry. Some embodiments may be provided by a computer program running on the at least one processor. The computer program may comprise computer implemented instructions which are stored in the at least one memory and which may be run on the at least one processor.

It is also noted herein that there are several variations and modifications which may be made to the disclosed solution without departing from the scope of the present disclosure.

The invention claimed is:

1. A computer device comprising:
a touch screen configured to receive a series of inputs from a user, each of the inputs comprising a single touch input of the user; and
at least one processor configured to:
cause the touch screen to display a computer implemented game on the touch screen, the computer implemented game comprising at least one game object controlled by the series of inputs;
determine based on a location of a tap input on the touchscreen a waypoint in a game area of the computer implemented game, the tap input being an input of the series of inputs,
determine a path for at least one game object, said path being from a current location of the at least one game object to the waypoint;
cause the at least one game object to move from the current location of the at least one game object to the waypoint along the determined path using a first type of movement of the at least one game object; and
receive a further input while the at least one game object is moving towards the waypoint, the further input comprising touching a first location on the touch screen for at least a threshold amount of time, and in response to cause the at least one game object to shoot and responsive to continued input by the user, controlling a shooting direction of the game object as the continued user input moves from the first location to a second location on the touch screen, while the at least one game object is caused to move towards the waypoint.

2. The computer device as claimed in claim 1, wherein the series of inputs provides a plurality of actions, at least one action modifying at least one other action to provide a combined action.

3. The computer device as claimed in claim 1, wherein the touch screen is configured such that at least a plurality of the series of inputs is provided in a same area of the touchscreen.

4. The computer device as claimed in claim 1, wherein the at least one processor is configured to cause the game area to be displayed on the touchscreen, the at least one game object being provided in the game area, the touch screen being configured to receive at least one of the series of inputs at any location in the displayed game area.

5. The computer device as claimed in claim 1, wherein at least one of the series of inputs comprises one or more of: a swipe across the touch screen, one or more taps on the touch screen; and a touch of the touch screen.

6. The computer device as claimed in claim 1, wherein for at least one input of the series of inputs, an associated action comprises control of a camera angle, the camera angle configured to control an image of the computer implemented game which is displayed on the touchscreen.

7. The computer device as claimed in claim 1, wherein for at least one input of the series of inputs, an associated action is dependent on a direction associated with the respective input.

8. The computer device as claimed in claim 1, wherein at least one of the series of inputs comprise a swipe and an associated action comprises control of a camera angle, the camera angle configured to control an image of the computer implemented game which is displayed on the touchscreen, whereby a direction of the swipe controls a direction of the camera angle.

9. The computer device as claimed in claim 1, wherein at least one of the series of inputs is configured to control which part of an environment of the computer implemented game is displayed on the touch screen.

10. The computer device as claimed in claim 1, wherein at least one of the series of inputs is configured to control a camera angle with respect to the game object about at least one axis defined with respect to the game object.

11. The computer device as claimed in claim 1, wherein a characteristic of at least one input of the series of inputs is compared with a threshold to determine an associated action.

12. The computer device as claimed in claim 11, wherein the characteristic comprises one or more of a distance moved on the touchscreen by a respective input, a length of time a respective input is provided on the touchscreen and a speed of a respective input with respect to the touch screen.

13. The computer device as claimed in claim 1, wherein at least one input of the series of inputs comprises a first number of taps with respect to the touch screen providing one action and at least one other input of the series of inputs comprises a second number of taps with respect to the touch screen providing another action.

14. The computer device as claimed in claim 1 wherein at least one action is caused to be performed by the game object at a location on the touch screen where one or more of the series of inputs is received.

15. The computer device of claim 1, wherein at least one input of the series of inputs is configured to provide a plurality of actions.

16. The computer device as claimed in claim 1, wherein the at least one processor is configured to:
   determine a second waypoint based on a location of a further tap input on the touch screen:
   determine a further touch on the touchscreen after the second waypoint has been set, said further touch being a further input in the series of inputs;
   determine an action in dependence on said further touch; and
   provide the determined action as the game object moves along the determined path to the second waypoint.

17. The computer device as claimed in claim 16, wherein the action comprises one of:
   sliding;
   rolling;
   climbing; and
   jumping.

18. The computer device as claimed in claim 16, wherein the determined action controls how the at least one game object moves along the determined path to the second waypoint.

19. The computer device as claimed in claim 16, wherein the determined action is performed while the at least one game object moves along the determined path to the second waypoint.

20. The computer device as claimed in claim 16, wherein the determined action is performed in parallel with the moving of the at least one game object along the determined path to the second waypoint.

21. The computer device as claimed in claim 16, wherein the at least one processor is configured to control movement of the at least one game object along the defined path in dependence on at least one of the number of taps and a rate of the taps.

22. A computer implemented method for controlling a touch screen of a computer device, the device comprising the touch screen and at least one processor, the method comprising:
   receiving via the touch screen a series of inputs from a user, each of the inputs comprising a single touch input of the user;
   causing, by the at least one processor, the touch screen to display a computer implemented game on the touch screen, the computer implemented game comprising at least one game object controlled by the series of inputs;
   determining, by the at least one processor, based on a location of a tap input on the touchscreen a waypoint in a game area of the computer implemented game, the tap input being an input of the series of inputs,
   determining, by the at least one processor, a path for at least one game object, said path being from a current location of the at least one game object to the waypoint;
   causing, by the at least one processor, the at least one game object to move from the current location of the at least one game object to the waypoint along the determined path using a first type of movement of the at least one game object; and
   receiving a further input while the at least one game object is moving towards the waypoint, the further input comprising touching a first location on the touch screen for at least a threshold amount of time, and in response to cause the at least one game object to shoot and responsive to continued input by the user, controlling a shooting direction of the game object as the continued user input moves from the first location to a second location on the touch screen, while the at least one game object is caused to move towards the waypoint.

23. A computer readable non-transitory storage medium carrying one or more computer executable instructions which when run on at least one processor cause:
   receiving by a touch screen a series of inputs from a user, each of the inputs comprising a single touch input of the user;
   displaying by the touch screen of a computer implemented game, the computer implemented game comprising at least one game object controlled by the series of inputs;
   determining, by the at least one processor, based on a location of a tap input on the touchscreen a waypoint in a game area of the computer implemented game, the tap input being an input of the series of inputs,
   determining, by the at least one processor, a path for at least one game object, said path being from a current location of the at least one game object to the waypoint;
   causing, by the at least one processor, the at least one game object to move from the current location of the at least one game object to the waypoint along the determined path using a first type of movement of the at least one game object; and
   receiving a further input while the at least one game object is moving towards the waypoint, the further input comprising touching a first location on the touch screen for at least a threshold amount of time, and in response to cause the at least one game object to shoot and responsive to continued input by the user, controlling a shooting direction of the game object as the continued user input moves from the first location to a second location on the touch screen, while the at least one game object is caused to move towards the waypoint.

* * * * *